United States Patent
Grunnet-Jepsen et al.

(10) Patent No.: US 6,778,102 B1
(45) Date of Patent: Aug. 17, 2004

(54) COMMUNICATION SYSTEM AND APPARATUS WITH SYNCHRONOUS ORTHOGONAL CODING

(75) Inventors: Anders Grunnet-Jepsen, Milpitas, CA (US); Alan E. Johnson, Milpitas, CA (US); Eric S. Maniloff, Ontario (CA); Thomas W. Mossberg, Eugene, OR (US); Michael J. Munroe, Petaluma, CA (US); John N. Sweetser, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 09/591,889

(22) Filed: Jun. 9, 2000

Related U.S. Application Data
(60) Provisional application No. 60/138,596, filed on Jun. 11, 1999.

(51) Int. Cl.[7] .............................................. H03M 7/00
(52) U.S. Cl. ......................................................... 341/50
(58) Field of Search ............................. 341/50, 68, 69, 341/70, 71; 375/259, 265, 260, 361

(56) References Cited

U.S. PATENT DOCUMENTS

| | | | |
|---|---|---|---|
| H484 H | 6/1988 | Holliday | |
| 5,537,396 A | 7/1996 | Kanda et al. | |
| 5,633,741 A | 5/1997 | Giles | |
| 5,768,269 A | 6/1998 | Rakib et al. | |
| 5,774,450 A | 6/1998 | Harada et al. | |
| 5,822,094 A | 10/1998 | O'Sullivan et al. | |
| 5,832,022 A | 11/1998 | Scott | |
| 5,901,321 A | 5/1999 | Kim et al. | |
| 5,910,964 A | 6/1999 | Sugita | |
| 5,966,376 A | 10/1999 | Rakib et al. | |
| 6,044,083 A | 3/2000 | Citta et al. | |
| 6,356,555 B1 * | 3/2002 | Rakib | 370/441 |

OTHER PUBLICATIONS

Rupf, M. et al., "Optimum Sequence Multisets for Synchronous Code–Division Multiple–Access Channels", IEEE Transactions on Information Technology, vol. 40, No. 4, pp. 1261–1266, Jul. 1994.

Lee et al., "Cross–talk Noise Analysis in Hologram Memory with Hybrid Multiplexing of the Hadamard Phase Code and Wavelength ", Optical Society of America, vol. 16, No. 3, pp. 563–567, Mar. 1999.

* cited by examiner

*Primary Examiner*—Brian Young
(74) *Attorney, Agent, or Firm*—Blakely, Sokoloff, Taylor & Zafman LLP (57) ABSTRACT

Code-multiplexed communication systems, apparatus, and methods include coders that encode and decode data streams with synchronous, substantially orthogonal codes. Code-multiplexed communications systems encode data signals with such codes to control levels of decoding artifacts such as cross-talk at times or time intervals in which data is recovered. Some systems are based on synchronous, orthogonal codes that are obtained from complex orthogonal vectors. In an example, a three-level temporal-phase code that includes nine code chips and encodes and decodes data signals is a seven-channel communication system.

21 Claims, 4 Drawing Sheets

COMMUNICATION SYSTEM AND APPARATUS WITH SYNCHRONOUS ORTHOGONAL CODING

CROSS REFERENCE TO RELATED APPLICATIONS

This application claims the benefit of U.S. Provisional Application Ser. No. 60/138,596, filed Jun. 11, 1999.

FIELD OF THE INVENTION

The invention pertains to optical communication systems.

BACKGROUND

The optical fiber communication infrastructure has expanded rapidly to satisfy the demands of communication customers requiring inexpensive, high-bandwidth transmission of voice, data, video, and other data streams. Inexpensive, high-speed communication has permitted the rapid expansion of Internet communication in addition to satisfying more traditional communication demands such as telephony.

Optical-fiber media have very large available communication bandwidths, and several approaches have been used to take advantage of this bandwidth. In one example, optical carriers have been modulated at high data rates, with data rates of 2.5 Gbit/s, 10.0 Gbit/s, and higher either installed or demonstrated. Using higher data rates, multiple data signals can be combined on a single optical carrier by modulating the optical carrier at different times for each of the data signals to be combined. This method is known as time-division multiplexing (TDM). Data bits are recovered from the modulated carrier and the detected bits are assigned to appropriate data signals, thereby demultiplexing the data signals.

In another method, multiple data streams are used to modulate optical carriers having different carrier wavelengths. The modulated carriers are combined and transmitted on a single optical fiber. To recover the data streams, the different carrier wavelengths are separated and the modulation of each carrier wavelength is detected. This method is known as wavelength-division multiplexing ("WDM").

While these methods permit the use of more of the available optical fiber bandwidth, they also exhibit several practical limitations. For example, high-data-rate TDM requires optical sources, detectors, and associated electronics that are capable of very high-bandwidth operation. Such components are typically expensive. WDM systems require frequency-stable and accurately tuned optical sources. Such sources and other associated components also can be expensive.

An additional method that takes advantage of the high bandwidths available with optical fibers is known as code-division multiple access ("CDMA"). In this method, individual data signals are encoded with corresponding encoders, and the coded signals are combined and delivered via optical fiber or other communication medium. The data signals are recovered by decoding the combined coded signal with decoders, each of which corresponds to one (or more) of the encoders used to code the data signals. In this method, the separation (demultiplexing) of different data signals depends on the codes used by the encoders and decoders. The number of data signals that can be combined depends on the number of available codes and acceptable levels of channel crosstalk. Available codes tend to produce unacceptable levels of crosstalk between the decoded signals, i.e., a decoded data signal corresponding to a selected data signal contains artifacts due to other data signals. Such crosstalk is particularly troublesome in systems in which many data signals are to be multiplexed. For these reasons, improved methods and apparatus are needed for code-based multiplexing.

SUMMARY OF THE INVENTION

Codes and code-based multiplexing methods and apparatus are provided that permit increased numbers of data signals to be multiplexed while maintaining channel crosstalk and other coding artifacts at acceptable levels.

Code-based communication systems comprise a coder that applies a code selected from a set of synchronous, substantially orthogonal codes to a data stream. In specific embodiments, the codes are selected from a set of orthogonal codes and these codes are applied to data signals as temporal codes. In a representative embodiment, the codes are temporal phase codes.

Methods of coding a data stream include selecting a time interval and dividing the time interval into two or more time chips. Each of the time chips is assigned a modulation value based on a code. The data stream is divided into portions corresponding to the time chips, and the modulation values assigned to the time chips are coded onto corresponding portions of the data stream. In representative examples, the code is a discrete phase code, or a temporal phase code, and is selected from a set of synchronous, substantially orthogonal codes. In a specific example, the code is selected from the set consisting of the phase codes: $(4\pi/3, 2\pi/3, 0, 2\pi/3, 4\pi/3, 0, 0, 0, 0)$, $(4\pi/3, 0, 4\pi/3, 0, 0, 2\pi/3, 2\pi/3, 0, 0)$, $(0, 4\pi/3, 2\pi/3, 0, 2\pi/3, 4\pi/3, 0, 0, 0)$, $(2\pi/3, 4\pi/3, 0, 0, 0, 4\pi/3, 2\pi/3, 0, 0, 4\pi/3, 4\pi/3, 2\pi/3, 0)$, $(0, 0, 0, 4\pi/3, 2\pi/3, 0, 2\pi/3, 4\pi/3, 0)$, $(0, 4\pi/3, 4\pi/3, 2\pi/3, 4\pi/3, 2\pi/3, 4\pi/3, 4\pi/3, 0)$, and $(4\pi/3, 0, 2\pi/3, 4\pi/3, 4\pi/3, 4\pi/3, 4\pi/3, 2\pi/3, 0)$.

Coders for encoding an optical-data stream include a circulator that receives the optical-data stream; and an optical fiber that receives the optical-data stream from the circulator. The optical fiber includes two or more reflectors situated and configured to apply a code to the data stream. The code can be a synchronous, substantially orthogonal code selected from a set of substantially orthogonal codes.

Coders for coding an input-data stream include two or more reflectors situated and configured to selectively reflect portions of the input-data stream according to a synchronous code. According to representative embodiments, the synchronous code is an orthogonal code, a temporal code, a phase code, or a three-level phase code. In additional embodiments, the reflectors are defined by gratings.

Communication methods include selecting a set of synchronous codes and assigning a synchronous code from the set to each of a plurality of data channels. Data streams are encoded corresponding to the data channels based on respective synchronous codes. In representative embodiments, encoded data streams are combined to form a combined, coded data stream. In specific embodiments, the codes are orthogonal codes, substantially orthogonal codes, or temporal phase codes.

Additional communication methods include receiving the combined coded data stream and decoding portions of the combined coded data stream based on the synchronous codes.

Methods of code-based multiplexing in a wavelength-division multiplexed (WDM) communication system include selecting at least one carrier signal of a selected wavelength of the WDM communication system. The carrier signal is divided into portions that are modulated based on data streams and codes assigned to each portion, wherein the codes are selected from a set of substantially orthogonal, temporal codes.

These and other features and advantages of the invention are illustrated below with reference to the accompanying drawings.

DETAILED DESCRIPTION

Figure 1:
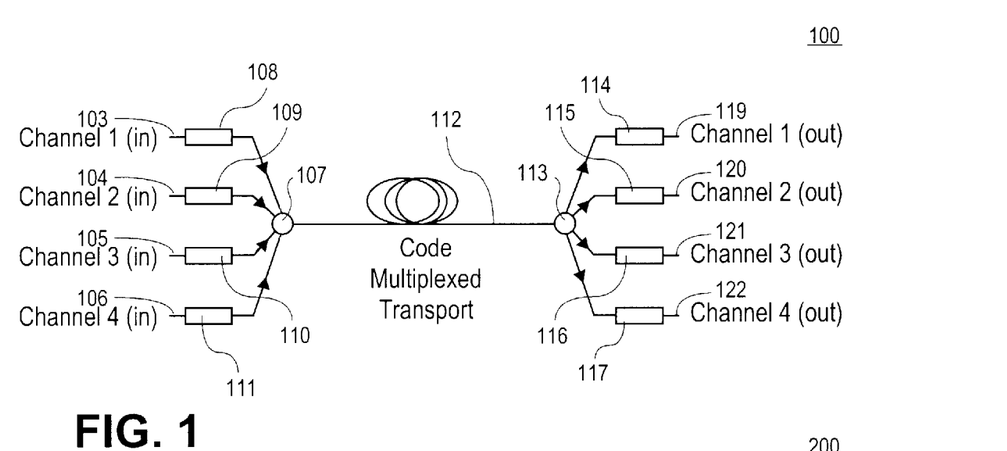
FIG. 1 is a schematic diagram of a code-multiplexed communication system.

With reference to FIG. 1, a code-based multiplexed communication system 100 includes channel inputs 103, 104, 105 106 that receive data signals from respective data sources (not shown in FIG. 1). Corresponding channel encoders 108, 109, 110, 111 encode respective data signals and deliver coded data signals to a combiner 107. (For convenience, both "encoders" and "decoders" are referred to herein as "coders.") The combiner 107 combines the coded data signals to form a combined, coded data signal and directs the combined, coded data signal to an optical fiber 112 or other transport medium. The combined, coded data signal is received by a splitter 113 that delivers portions of the combined, coded data signal to respective decoders 114, 115, 116, 117 that decode the combined, coded data signal and provide decoded data signals to respective channel outputs 119, 120, 121, 122. Typically, the decoders 114, 115, 116, 117 are matched to corresponding channel encoders 108, 109, 110, 111.

The operation of the code-based multiplexing communication system 100 of FIG. 1 includes encoding data signals according to codes applied by the channel encoders 108–111 to data signals applied to the respective channel inputs 103–106. Generally, the data signals are independent, and each of the channel encoders 108–111 codes according to a different respective code. The splitter 113 typically directs respective portions of the combined, coded data signal to each decoders 114–117. Therefore, each of the decoders 114–117 receives data corresponding to several (or all) of the data signals, and the decoding process permits recovery of selected data signals from the combined, coded data signal. Communication channels are typically selected by assigning codes for encoding and decoding a data signal assigned to a particular data channel. The codes can be permanently assigned and coded by dedicated encoders/decoders. Alternatively, the codes can be reconfigurably assigned so that the coders are programmable to encode/decode a variety of codes.

A decoded signal produced by a selected decoder generally includes some crosstalk or other contributions from data signals coded by channel encoders that are not matched to the selected decoder. Such contributions can interfere with data recovery from the decoded signal, increasing the bit-error rate of the corresponding communication channel. These contributions depend on the codes assigned to the channels. The codes coded by the channel encoders/decoders can have a variety of forms, and these forms can determine many properties of a code-based multiplexing communication system, including channel cross-talk levels and bit-error rates.

Figure 2A:
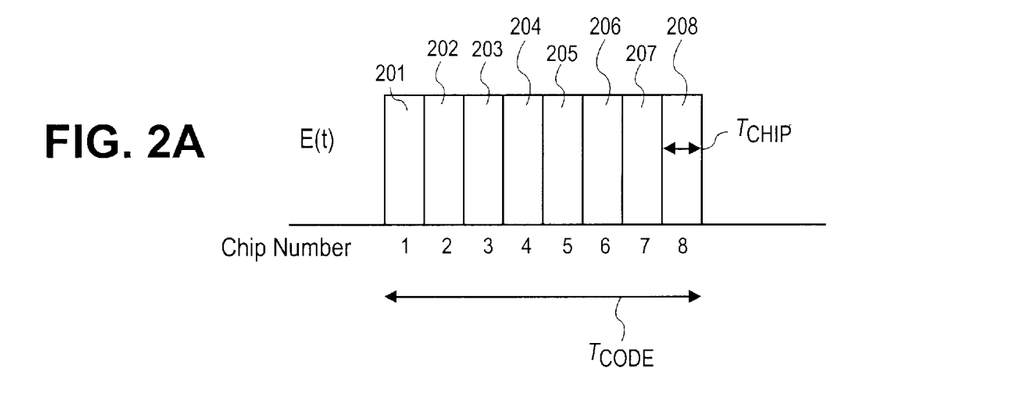
FIG. 2A is a schematic diagram of a temporal code template illustrating a division of a time interval into subintervals ("chips") to which phase or amplitude values are assigned based on a code.

Codes for code-based multiplexing can be conveniently designed based on code templates. A representative code template 200 is illustrated schematically in FIG. 2A. The code template 200 spans a time interval $T_{CODE}$ and is divided into 8 time intervals ("chips") 201–208 each having a duration $T_{CHIP}$. As shown in FIG. 2A, the chips 201–208 have equal durations, but chips of unequal duration can be used. A spread-spectrum bandwidth is given by the inverse of the chip duration $T_{CHIP}$, and data streams coded with a selected code typically have a bandwidth of approximately the spread-spectrum bandwidth. A code based on the code template 200 specifies an amplitude, phase, or combination of amplitude and phase to be coded onto an optical signal at times corresponding to the various chips. For a communication system that codes several channels, codes (based on the code template 200) are assigned to each of the channels. These codes form a set referred to as a "code set."

A data signal to be coded (encoded or decoded) is based on a time-varying field, such as an electromagnetic field. An electric field of such a signal can be represented as $E(t_j) = A_j e^{i\phi_j}$, wherein $A_j$ is an amplitude and $\phi_j$ is a phase of a jth chip, and j is an integer. Various combinations of amplitudes and phases can be used to define a code set. In a particular example, codes can assign a constant field amplitude ($A=A_j$ for all j) but with phases $\phi_j$ that vary from chip to chip. Other codes assign different field amplitudes for two or more of the chips, and additional codes have chips that assign varying combinations of amplitude and phase to each of the chips.

As shown in FIG. 2A, the code template 200 represents either temporal phase codes or amplitude codes, or a combination thereof. One specific code type is a multiple-level phase code in which one of several values of phase are assigned to the code chips while the amplitudes are the same. A representative phase code of three chips can be written as a row vector ($\phi_1, \phi_2, \phi_3$). A code set that includes similar codes is listed below in Table 1. A code defined by a limited number of phase or amplitudes is referred to as a "discrete code." As a representative example, three phases can be used to define a seven- or nine-chip code such that each of the chips is assigned one of the three phases.

Figure 2B:
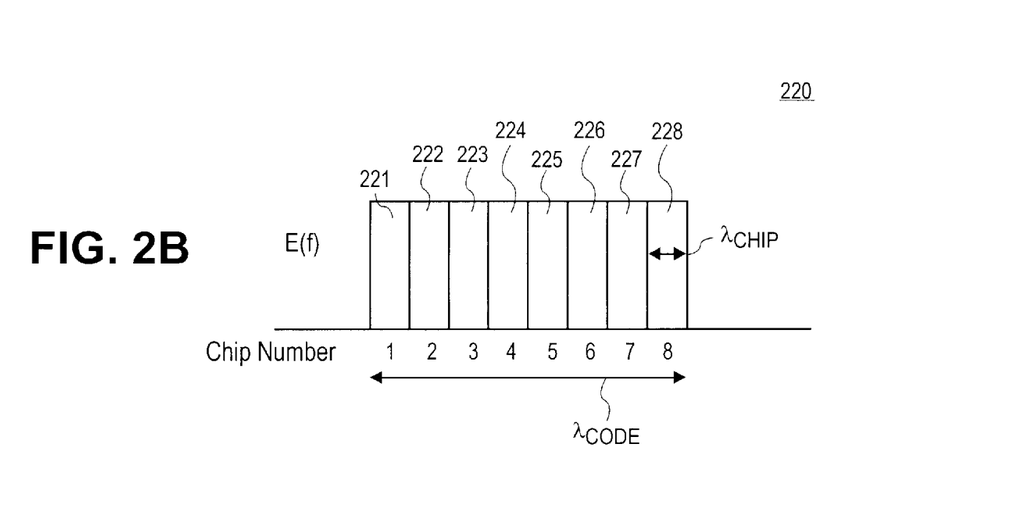
FIG. 2B is a schematic diagram of a spectral code template illustrating a division of a wavelength interval into subintervals ("chips") to which phase or amplitude values are assigned based on a code.

The code template 200 of FIG. 2A is a temporal code template. With reference to FIG. 2B, a spectral code template 220 spans a wavelength range $\lambda_{CODE}$ and includes wavelength (or spectral) chips 221–228 that span a wavelength range $\lambda_{CHIP}$. Spectral coding can be represented as coding that produces an electric field as a function of frequency $E(f_j) = A_j e^{i\phi_j}$, wherein $f_j$ is a frequency, and $A_j$ is an amplitude and $\phi_j$ is a phase of a jth chip. The chips of a spectral code can assign various combinations of amplitude $A_j$ and phase $\phi_j$ to an optical signal or other signal. Code templates, codes, and code sets for temporal coding, including temporal phase coding, are adaptable to spectral coding. Because code-based multiplexing based on spectral coding tends to be less compatible than temporal coding with wavelength-division multiplexing ("WDM"), embodiments based on temporal coding are described herein.

As shown in FIGS. 2A–2B, the code templates 200, 220 include a continuous time interval $T_{CODE}$ or spectral range $\lambda_{CODE}$, respectively. However, code templates can include discontinuous time intervals and spectral ranges. The amplitudes and/or phases assigned to code chips can be binary levels or multiple levels, or can be continuous values.

Code-multiplexed data can have temporally overlapping bits ("dense code-multiplexing") or non-overlapping bits ("sparse multiplexing"). In addition, the code-multiplexed data signals can be based on a common clock or otherwise synchronized, and code-based multiplexing systems comprising such signals are referred to as "synchronous code-multiplexed." Channel cross-talk and channel bit-error rates in synchronous code-based systems can be controlled by controlling the temporal placement of codes relative to each other and by using codes that produce relatively small levels of cross-talk or other artifacts at selected times, and that permit higher levels of cross-talk or other artifacts at other times. Such control is particularly useful in dense code-multiplexed systems. If spectral codes are used, spectral placement of coding artifacts can be controlled.

Figure 3A:
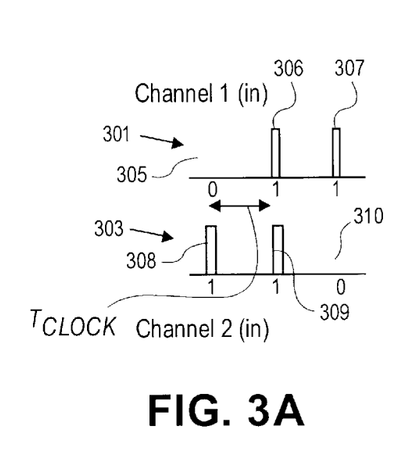
FIGS. 3A–3C are schematic diagrams illustrating a data bit prior to encoding, as encoded, and as decoded, respectively.

With reference to FIG. 3A, representative data streams 301, 303 are shown prior to encoding. The data streams 301, 303 are represented as sequential bits 305–307 (011), 308–310 (110), respectively. The data streams 301, 303 are based on a common clock frequency. In addition, the bits 305–307 of the data stream 301 are in phase with corresponding bits 308–310, respectively, of the data stream 303. For example, the bits 306, 308 are approximately simultaneous. However, such simultaneity is unnecessary, and a constant phase difference (delay) between corresponding bits of the data streams 301, 303 is satisfactory.

Figure 3B:
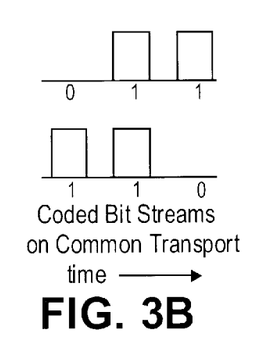
Figure 3C:
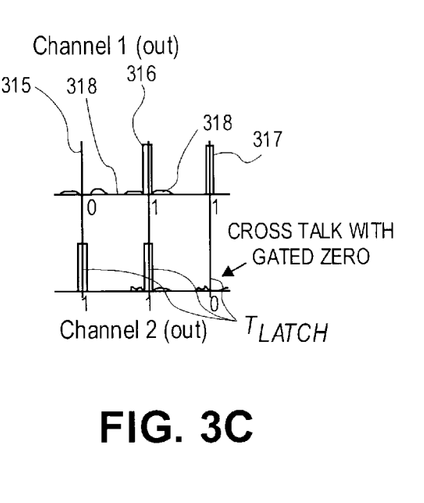

FIGS. 3B–3C illustrate the data streams 301, 303 after encoding and decoding, respectively. Referring to FIG. 3C, decoded bits 315–317 correspond to the bits 305–307 but include contributions 318 due to the presence of bits of the data stream 303 in the combined data signal that is decoded. The degradation in bit error rate and other data errors are reduced by encoding and decoding the data streams 301, 303 based on codes such that the contributions 318 do not appear at specified latch times $T_{LATCH}$ at which the bits are electronically latched, i.e., assigned "0" or "1" values based on the value of the decoded signal at the latch times $T_{LATCH}$. Codes that provide a zero-cross-talk time or time interval (or a low cross-talk time or time interval) reduce the magnitude of the contributions 318 and are referred to herein as "synchronous, substantially orthogonal codes." With such codes, the contributions 318 (such as crosstalk) are time-displaced from the temporal positions $T_{LATCH}$ at which data bits are recovered from the decoded signal. Typically the contributions 318 are displaced from the temporal positions $T_{LATCH}$ and spread over a time interval of as much as approximately $(2N_{chips}-1) T_{CHIP}$, wherein $N_{chips}$ is a number of chips in a selected code.

Prior to coding, each of the bits 303–305, 308–310 of FIG. 3A can span a spectral bandwidth as large a spectral bandwidth used in a WDM system, typically 20–40 GHz. The bits can be provided in many ways, including direct or external modulation of standard communications-grade lasers. In addition, the coding/decoding illustrated in FIGS. 3A–3B is exemplary, and features shown therein are not limiting. For example, the bits 303–305, 308–310 need not be substantially shorter than the clock period $T_{CLOCK}$, and the bits can have Fourier-transform-limited spectra, or other spectra such as a frequency chirp.

The selection of synchronous, substantially orthogonal codes to reduce crosstalk depends on the decoding process and physical limitations in encoders/decoders. If a signal (such as an electric field) is coded with a code m from a set of M codes and is decoded by a decoder designed to match a code n, then an output power $P_{mn}(t)$ produced by decoding a signal coded with the mth code and decoded with the nth code is preferably small. In particular, $P_{mn}(t=0)=P_o\delta_{mn}$, wherein $\delta_{mn}$ is the Kronecker delta function ($\delta_{mn}=1$ for m=n and $\delta_{mn}=0$ otherwise). Codes that satisfy the condition $P_{mn}(t=0)=P_o\delta_{mn}$ are referred to as "synchronous, orthogonal codes," and can provide low cross-talk in a code-based optical communication system. In contrast, substantially orthogonal codes can have some nonzero component at t=0, but small enough to permit accurate data recovery even in the presence of unmatched data signals.

In coders (encoders and decoders) that code an electric field by performing a cross-correlation of a coded input electric field $E_m(t)$ and a decoder code that is matched to a code n, corresponding to a field $E_n(t)$, the output power is:

$$P_{mn}(t) = \left| \int_{-\infty}^{\infty} dt' E_m(t') E_n^*(t+t') \right|^2,$$

wherein * denotes complex conjugation of the code function. At time t=0, the power $P_{mn}(t)$ is:

$$P_{mn}(t=0) = \left| \int_{-\infty}^{\infty} dt' E_m(t') E_n^*(t') \right|^2,$$

which is the squared modulus of an overlap integral between the input code (code m) and the complex conjugate of the decoder code (code n). Thus, at a selected time, orthogonal codes satisfy the relationship:

$$\left| \int_{-\infty}^{\infty} dt' E_m(t') E_n^*(t') \right|^2 = P_o \delta_{mn}.$$

This relationship is a standard definition of orthogonality between two complex functions. Thus, any set of orthogonal functions as defined above may be used to construct synchronous, orthogonal encoders and decoders. Orthogonal spectral codes satisfy a similar spectral relationship, i.e., $$\left| \int_{-\infty}^{\infty} df E_m(f) E_n^*(f) \right|^2 = P_o \delta_{mn},$$

wherein f is frequency, and $E_m$ is a frequency-dependent coded field. Thus, a set of orthogonal codes can be used to define either temporal or spectral codes, or both.

The integrals given above describe continuous codes having arbitrarily small $_{chips}$. These continuous codes can be based on continuous functions. Generally, code sets include codes based on a limited number of chips, and a temporal or spectral interval is segmented to define a series of temporal or spectral chips as shown in the code templates of FIGS. 2A–2B. With division into chips, the single-time orthogonality relationship written above becomes:

$$\left|\sum_{j}^{N_{chips}} E_m(t_j)E_n^*(t_j)\right|^2 = P_o \delta_{mn}.$$

Equivalently, the relationship may be written as:

$$\sum_{j}^{N_{chips}} E_m(t_j)E_n^*(t_j) = e^{i\varphi}\sqrt{P_o}\,\delta_{mn},$$

wherein φ is an arbitrary phase factor. This expression is equivalent to a dot product of a vector representing an mth code and a vector corresponding to a complex conjugate of a an nth code, wherein both vectors include $N_{chips}$ components. Writing the mth and nth codes in terms of corresponding amplitudes and phases, the orthogonality relationship becomes:

$$\sum_{j}^{N_{chips}} A_j^m A_j^n \exp(i(\varphi_j^m - \varphi_j^n)) = e^{i\varphi}\sqrt{P_o}\,\delta_{mn}.$$

For amplitude codes (in which all phase terms are equal), the relationship is:

$$\sum_{j}^{N_{chips}} A_j^m A_j^n = e^{i\varphi}\sqrt{P_o}\,\delta_{mn}.$$

Therefore, any set of orthogonal real vectors with $N_{chips}$ components forms a set of synchronous, orthogonal codes.

For phase-only, synchronous, orthogonal codes, the orthogonality relationship is:

$$\sum_{j}^{N_{chips}} \exp(i(\varphi_j^m - \varphi_j^n)) = e^{i\varphi} N_{chips}\delta_{mn}.$$

Codes and code sets can be obtained analytically based on these orthogonality relationships. Monte Carlo methods can also be used to search for synchronous, orthogonal code sets. In addition, codes such as Walsh codes, Hadamard codes, Gold codes, and Kasami codes can be adapted for coding as described above.

One simple method of obtaining code sets includes quantizing the phase levels of the codes into $N_{phase}$ equally spaced phase levels. Coders based on codes having a discrete phase levels also permit simpler manufacturing processes. For quantized phase levels, the orthogonality relationship is:

$$\sum_{j}^{N_{chips}} \exp\!\left(i\left(\frac{2\pi}{N_{phases}}l_m - \frac{2\pi}{N_{phases}}l_n\right)\right) = e^{i\varphi} N_{chips}\delta_{mn},$$

wherin $l_n \in \{0,1,\ldots,N_{phases}-1\}$. Such a code set is shown in Table 1. The code set Table 1 includes seven codes each having nine chips, wherein $N_{phases}=3$.

TABLE 1

| Code | $\phi_1$ | $\phi_2$ | $\phi_3$ | $\phi_4$ | $\phi_5$ | $\phi_6$ | $\phi_7$ | $\phi_8$ | $\phi_9$ |
|---|---|---|---|---|---|---|---|---|---|
| 1 | 4 π/3 | 2 π/3 | 0 | 2 π/3 | 4 π/3 | 0 | 0 | 0 | 0 |
| 2 | 4 π/3 | 0 | 4 π/3 | 0 | 0 | 2 π/3 | 2 π/3 | 0 | 0 |
| 3 | 0 | 4 π/3 | 2 π/3 | 0 | 2 π/3 | 4 π/3 | 0 | 0 | 0 |
| 4 | 2 π/3 | 4 π/3 | 0 | 0 | 0 | 0 | 4 π/3 | 2 π/3 | 0 |
| 5 | 0 | 0 | 0 | 4 π/3 | 2 π/3 | 0 | 2 π/3 | 4 π/3 | 0 |
| 6 | 0 | 4 π/3 | 4 π/3 | 2 π/3 | 4 π/3 | 2 π/3 | 4 π/3 | 4 π/3 | 0 |
| 7 | 4 π/3 | 0 | 2 π/3 | 4 π/3 | 4 π/3 | 4 π/3 | 4 π/3 | 2 π/3 | 0 |

Temporal phase coding using code sets such as those of Table 1 can be as robust as amplitude-based coding with respect to signal-transmission degradations caused by attenuation and cross-talk. Additional code sets can be obtained as described above.

In a specific example, a 2.5 Gbit/s data stream having $T_{BIT}=400$ PS is encoded with codes of the code set of Table 1. The $_{chip}$ duration $T_{CHIP}$ is selected as approximately $T_{BIT}/N_{chips}=400/9$ ps=44.4 psec. To avoid intersymbol interference, bits of the input data stream are typically configured to have a bit duration of about 200 psec because the decoding process can produce outputs in a time interval of as much as $(2N_{chips}-1)T_{CHIP}$. The bandwidth of the 2.5 Gbit/s is selected to be about $1/T_{CHIP}$ or about 23 GHz.

Figure 4:
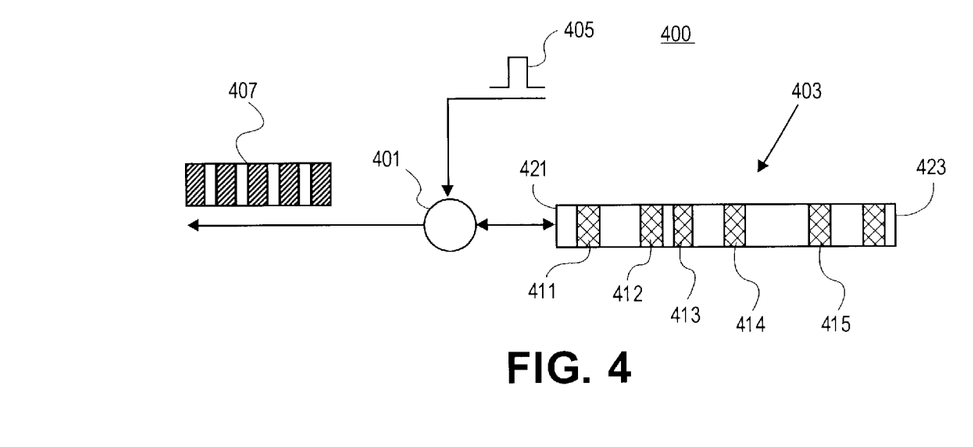
FIG. 4 is schematic diagram of a coder that includes gratings defined in an optical fiber.

An encoder 400 for encoding an optical data stream as specified by a selected code is illustrated in FIG. 4. The encoder 400 includes a circulator 401 and a fiber-grating coder 403. The fiber-grating coder 403 comprises gratings 411–415 or other reflectors that direct portions of the optical data stream as specified by a code. The gratings 411–415 are formed as periodic variations in refractive index of a core or cladding of an optical fiber. An uncoded bit 405 is directed to the circulator 401 and then to an input 421 of the fiber-grating coder 403. Portions of the uncoded bit 405 are reflected by the gratings 411–415, are returned to the circulator 401, and form a coded bit 407. The relative positions and reflectances of the gratings 411–415 are selected based on the phases and amplitudes of the $_{chips}$ of a selected code. A decoder matched to the encoder 400 can be made by arranging the fiber-grating coder 403 so that the coded output (and typically portions of unmatched coded outputs produced by encodings with a different code of a code set) is directed from the circulator 401 to a surface 423 of the fiber-grating coder 403.

Positions of gratings such as the grating 411–415 correspond to a selected code. If the reflectances of such gratings are low, then the placement of the gratings is readily accomplished based on the phases to be coded. If the grating reflectances are large, an input data stream is depleted as the data stream propagates through the gratings. Grating placement in such a coder can be determined using a simulated annealing process implemented as a design program on a computer.

Figure 5:
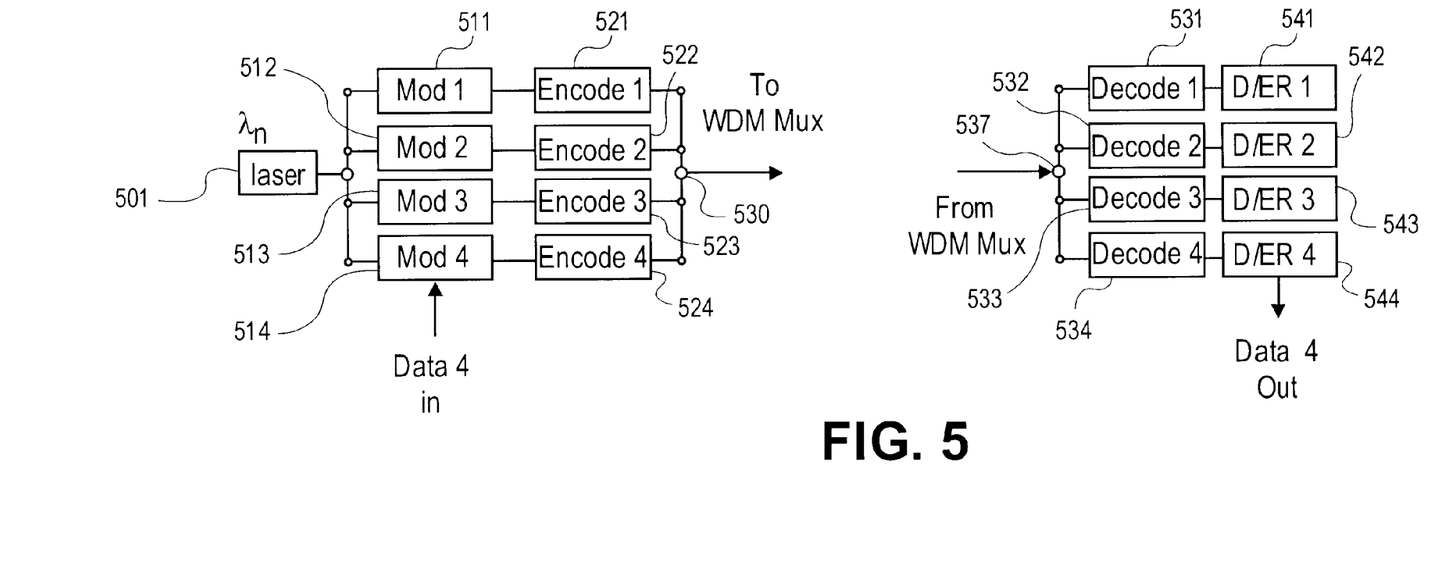
FIG. 5 is a schematic block diagram of a single wavelength channel of a wavelength-division multiplexed (WDM) communication system that includes code-based multiplexing.

FIG. 5 is a schematic diagram of a single WDM channel that includes four code-based channels. A laser 501 supplies power to a splitter 503 at a selected WDM wavelength $\lambda_n$. The splitter 503 directs portions of the laser power to modulators 511–514 that modulate respective portions according to data based on data from data sources such as a data source 515 (not shown in FIG. 5). The respective modulated portions from the modulators 511–514 are directed to corresponding encoders 521–524 that encode the modulated portions. A combiner 530 receives and combines the modulated, coded power portions and directs the combined power to a WDM multiplexer (not shown). Data is recovered by extracting power at the selected WDM wavelength and directing portions of this power to respective decoders 531–534 that correspond to the encoders 521–524, respectively. Typically an encoder and decoder are matched so that the decoder processes the data signal produced by the encoder so that data can be recovered. Corresponding receiver modules 541–544 recover data for each of the channels. As illustrated in FIG. 5, code-based multiplexing is implemented on a single WDM wavelength $\lambda_n$, data signals can be code-multiplexed on two or more such WDM wavelengths.

Figure 6:
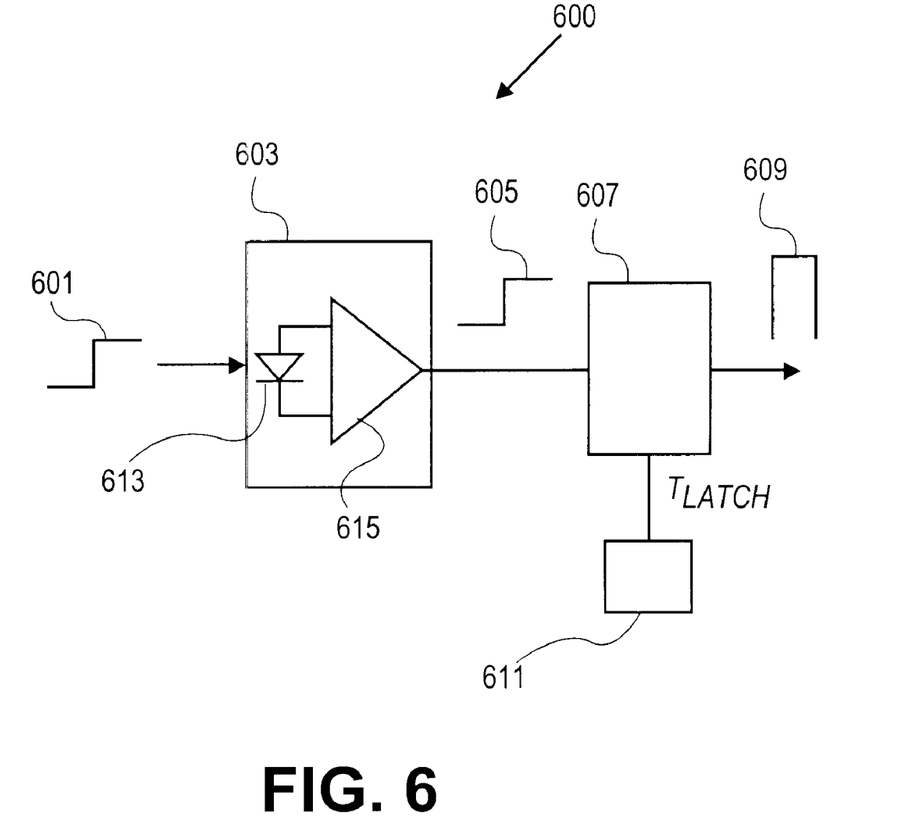
FIG. 6 is a schematic block diagram of a detection system that recovers data from a decoded data stream.

With reference to FIG. 6, a detection system 600 that receives a decoded optical data stream 601 includes a detector 603 that converts the decoded optical data stream 601 to an electrical data stream 605, typically a time-varying electrical voltage or current. Typically, the detector 603 includes a photodetector 613 and an amplifier 615. The electrical signal 605 is delivered to a data recovery module 607 that provides a data output 609 that, in the absence of data recovery error, corresponds to the data transmitted, prior to encoding and decoding. A latch time controller 611 is configured to adjust a latch time or times to vary times at which the data recovery module 607 identifies a bit as a "0" bit or a "1" bit. Typically, the detector 603 partially time-integrates the data stream 601 and the latch controller permits adjustment of a latch time $T_{LATCH}$ so that contributions of coding artifacts do not substantially increase an error rate in the data output. Such adjustment is based on a code set used for encoding/decoding or an error rate detected in the data output 609.

The code-based communication methods and apparatus described herein permit passive coding of optical and other signals, produce low levels of decoding artifacts at latch times, and permit higher levels at other times. Communication methods based on frequency shifting such as those used in wireless code-division multiple-access systems use active coders and produce decoding artifacts (such as cross-talk) at different frequencies that are not displaced from the latch times. Passive coders are especially attractive for optical communication because of the expense and complexity of active coders for use at optical carrier frequencies. Encoding and decoding of an uncoded data stream is illustrated above, but coded data streams can be recoded in order to further identify a destination for the data stream.

Aspects of the invention have been described with reference to several representative embodiments, but the invention is not limited to these embodiments. It will be obvious to those skilled in the art that these embodiments can be modified and that such modifications remain within the spirit and scope of the invention. We claim all that is encompassed by the appended claims.

We claim:

1. A code-based communication system, comprising a coder to apply a temporal phase code selected from a set of synchronous, substantially orthogonal codes to a data stream.

2. The communication system of claim 1, wherein to apply the temporal phase code the coder divides a time interval into a plurality of time chips.

3. The communication system of claim 2, wherein the coder codes the temporal phase code onto the data stream at times corresponding to the plurality of time chips.

4. A method of coding a data stream, comprising:
   selecting a time interval;
   dividing the time interval into two or more time chips;
   assigning each of the time chips a modulation value based on a code;
   dividing the data stream into portions corresponding to the time chips; and
   applying the modulation values assigned to the time chips to corresponding portions of the data stream.

5. The method of claim 4, wherein the code is a discrete phase code.

6. The method of claim 5, wherein the code is selected from the set consisting of ($4\pi/3$, $2\pi 13$, 0, $2\pi/3$, $4\pi/3$, 0, 0, 0, 0), ($4\pi/3$, 0, $4\pi/3$, 0, 0, $2\pi/3$, $2\pi/3$, 0, 0), (0, $4\pi/3$, $2\pi/3$, 0, $2\pi/3$, $4\pi 3$, 0, 0, 0), ($2\pi/3$, $4\pi/3$, 0, 0, 0, 0, $4\pi/3$, $2\pi/3$, 0), (0, 0, 0, $4\pi/3$, $2\pi/3$, 0), (0, $4\pi/3$, $4\pi/3$, $2\pi/3$, $4\pi/3$, $2\pi/3$, $4\pi/3$, $4\pi/3$, 0), and ($4\pi/3$, 0, $2\pi/3$, $4\pi/3$, $4\pi/3$, $4\pi/3$, $4\pi/3$, $2\pi/3$, 0).

7. A coder for encoding an optical data stream, comprising:
   a circulator that receives the optical data stream; and
   an optical fiber that receives the optical data stream from the circulator, the optical fiber including two or more reflectors situated and configured to apply a temporal phase code to the data stream.

8. The coder of claim 7, wherein the temporal phase code is defined by a set of orthogonal codes.

9. A coder for coding an input data stream, comprising a plurality of reflectors situated and configured to selectively reflect portions of the input data stream according to a synchronous code, wherein the synchronous code is a temporal code.

10. The coder of claim 9, wherein the synchronous code is an orthogonal code.

11. The coder of claim 10, wherein the synchronous code is a phase code.

12. The coder of claim 11, wherein the synchronous code is a three-level phase code.

13. The coder of claim 9, wherein the reflectors are defined by Bragg gratings in an optical fiber.

14. A communication method, comprising:
   selecting a set of temporal phase codes;
   assigning a temporal phase code from the set to each of a plurality of data channels; and
   encoding data streams corresponding to the data channels based on respective temporal phase codes.

15. The method of claim 14, further comprising combining the encoded data streams to form a combined, coded data stream.

16. The method of claim 14, wherein the temporal phase codes are orthogonal codes.

17. The method of claim 15, further comprising:
   receiving the combined, coded data stream; and
   decoding portions of the combined, coded data stream based on the temporal phase codes.

18. A method for performing code-based multiplexing in a wavelength-division multiplexed (WDM) communication system, the method comprising:
   selecting at least one carrier signal of a selected wavelength of the WDM communication system;
   dividing the carrier signal into portions;
   modulating the portions based on data streams; and
   coding the portions with a respective assigned code selected from a set of substantially orthogonal, temporal codes.

19. A detection system for recovering data from a decoded optical data stream, the system comprising:
   a detector that converts the optical data stream into an electrical data stream; and
   a latch controller situated and configured to select a latch time, wherein the latch controller selects the latch time to avoid coding artifacts in the electrical data stream.

20. A method of recovering data from a decoded data stream, the method comprising:
   receiving the decoded data stream; and
   selecting a latch time for recovering a data bit from the decoded data stream, the latch time selected to avoid a decoding artifact.

21. The method of claim 20, wherein the latch time is selected based on a synchronous, orthogonal code.

* * * * *

UNITED STATES PATENT AND TRADEMARK OFFICE
CERTIFICATE OF CORRECTION

PATENT NO. : 6,778,102 B1
DATED : August 17, 2004
INVENTOR(S) : Grunnet-Jepsen et al.

It is certified that error appears in the above-identified patent and that said Letters Patent is hereby corrected as shown below:

Column 9,
Line 66, delete "$2\pi 13$" and insert -- $2\pi/3$ --.

Column 10,
Line 1, delete "$4\pi 3$" and insert -- $4\pi/3$ --.
Line 2, after the third occurrence of "0", insert -- , $2\pi/3$, $4\pi/3$, 0 --.

Signed and Sealed this

Thirtieth Day of November, 2004

JON W. DUDAS
*Director of the United States Patent and Trademark Office*